(12) United States Patent
Ball et al.

(10) Patent No.: US 6,222,847 B1
(45) Date of Patent: Apr. 24, 2001

(54) APPARATUS AND METHOD FOR RETRIEVING DATA FROM A NETWORK SITE

(75) Inventors: Thomas J. Ball; Glenn R. Bruns, both of Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/999,708

(22) Filed: Oct. 8, 1997

(51) Int. Cl.[7] .............................. H04L 12/28; H04L 12/56
(52) U.S. Cl. ................................................... 370/410
(58) Field of Search ............................ 370/410, 252, 370/411, 401, 403, 404, 405, 412, 413, 255, 254; 707/3, 4, 5, 10, 101, 102, 103, 501, 506, 513, 515, 516, 526

(56) References Cited

U.S. PATENT DOCUMENTS

| | | | |
|---|---|---|---|
| 5,745,900 | * 4/1998 | Burrows | 707/102 |
| 5,809,512 | * 9/1998 | Kato | 707/502 |
| 5,838,906 | * 11/1998 | Doyle et al. | 709/202 |
| 5,970,499 | * 10/1999 | Smith et al. | 707/104 |
| 5,974,455 | * 10/1999 | Monier | 709/223 |
| 6,012,083 | * 1/2000 | Savitzky et al. | 709/202 |
| 6,014,134 | * 1/2000 | Bell et al. | 345/329 |

* cited by examiner

*Primary Examiner*—Dang Ton
*Assistant Examiner*—Phirin Sam
(74) *Attorney, Agent, or Firm*—Joseph E. Funk

(57) ABSTRACT

An apparatus for retrieving data from a first network site for use by a second network site utilizes a template that specifies the location of the data within a response solicited from the first network site. The template is a mark-up document having a similar format to the response and thus, it is not an application program. A marker is included within the template to determine the location of the data within the response. A matching mechanism, which may be used with any template, is utilized to compare the template with the response to determine the exact location of the data within the response. The data may be retrieved when its location within the response is ascertained. Once retrieved, the data may be used by the second network site for display in a format that is specified by the second network site. Accordingly, data is located within the response with a template and not with a scanning application program.

22 Claims, 4 Drawing Sheets

APPARATUS AND METHOD FOR RETRIEVING DATA FROM A NETWORK SITE

FIELD OF THE INVENTION

This invention generally relates to data transmission networks and, more particularly, to retrieving data from a first network site via a second network site.

BACKGROUND OF THE INVENTION

The World Wide Web is a collection of servers connected to the Internet that utilize the Hypertext Transfer Protocol ("HTTP"). HTTP is a known application protocol that provides users with access to documents (e.g., web pages) written in a standard mark-up page description language known as Hypertext Markup Language ("HTML"). HTTP is used to transmit HTML web pages between a remote computer (e.g., a server) and a local computer in a form that is understandable to browser software (e.g., Netscape Navigator™, available from Netscape Communications Corporation of Mountain View, Calif.) executing on the local computer.

Among a number of basic document formatting functions, HTML enables software developers to specify graphical pointers (commonly referred to as "hyperlinks") on displayed web pages ("base web pages") that point to other web pages ("remote web pages") typically resident on remote servers. Once the remote web page is displayed, a user of a local computer system may freely review its contents and perform any functions that it provides. One such function, for example, may be obtaining specified data ("data") from the remote site. After the data is retrieved, it may be displayed by the local computer system in a selected format specified by the remote web page. Problems may arise, however, when utilizing such web page function. Primarily, access to the data through the remote web page interface may be cumbersome and thus, not intuitive to the user. Accordingly, the user may not be able to retrieve the desired data from the remote site. Similarly, even if the data is retrieved from the remote site, its display in the selected format also may be cumbersome and thus, not in a form that is easily understood by the user.

The art has responded to these and similar problems by enabling a base web site to automatically extract data from a remote web page, and then display the retrieved data in a format specified by the base web site. Accordingly, the base web site, and not the user, accesses the remote page to retrieve the data. A typical process that may be used for retrieving and displaying such data may begin when a user requests the data while accessing a base web page. In response, the base web site directs a data request to the remote site requesting the data. After retrieving the request, the remote site typically generates a response web page having the data. The response web page then is directed to the base web page for processing.

Instead of displaying the response web page which, undesirably, is in a form specified by the remote site, the base site executes a specially designed scanning procedure that scans the response web page for the data. Once the data is retrieved from the response by the scanning procedure, it may be displayed, via the base web page, in a format that is designed specially by the base web page.

As noted above, the scanning procedure is specially designed to retrieve the data from the remote web page. Such scanning procedure is implemented by writing an application program that utilizes either conventional procedural or object oriented programming techniques. To be effective, such program must be preconfigured with the location of the data to be retrieved within the remote web page. Accordingly, a new scanning application program must be written each time the format of a response web page is modified. Developing such new scanning application programs are very time consuming, however, thus adding to the overall cost of developing and maintaining the base web site.

It therefore would be desirable to have a method and apparatus that enables a base web page to efficiently retrieve information from a remotely linked web site without requiring that a scanning program be developed.

SUMMARY OF THE INVENTION

In accordance with one aspect of the invention, an apparatus for retrieving data from a first network site for use by a second network site utilizes a template that specifies the location of the data within a response solicited from the first network site. The template is a mark-up document having a similar format to the response and thus, it is not an application program. A marker is included within the template to determine the location of the data within the response. A matching mechanism, which may be used with any template, is utilized to compare the template with the response to determine the exact location of the data within the response. The data may be retrieved when its location within the response is ascertained. Once retrieved, the data may be used by the second network site as specified by the second network site. Accordingly, the location of the data is ascertained within the response with a template and not with a scanning application program.

In accordance with another aspect of the invention, a method of retrieving data from a first network site for use by a second network site first directs a request for the data to the first network site. Receipt of the request by the first network site generates a response having a predetermined location for the data. The method then receives a template having a marker for identifying the predetermined location of the data within the response. The marker in the template then is matched with the data in the response. Through this matching operation, a variable within the marker is assigned the same value as the data. Finally, the variable is provided to the second network site for any use.

In accordance with yet another aspect of the invention, the step of matching for the above noted method first determines the location of the predetermined location in both the template and the response. The value of the data in the predetermined location then is assigned to the variable.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF ILLUSTRATIVE EMBODIMENTS

Figure 1:
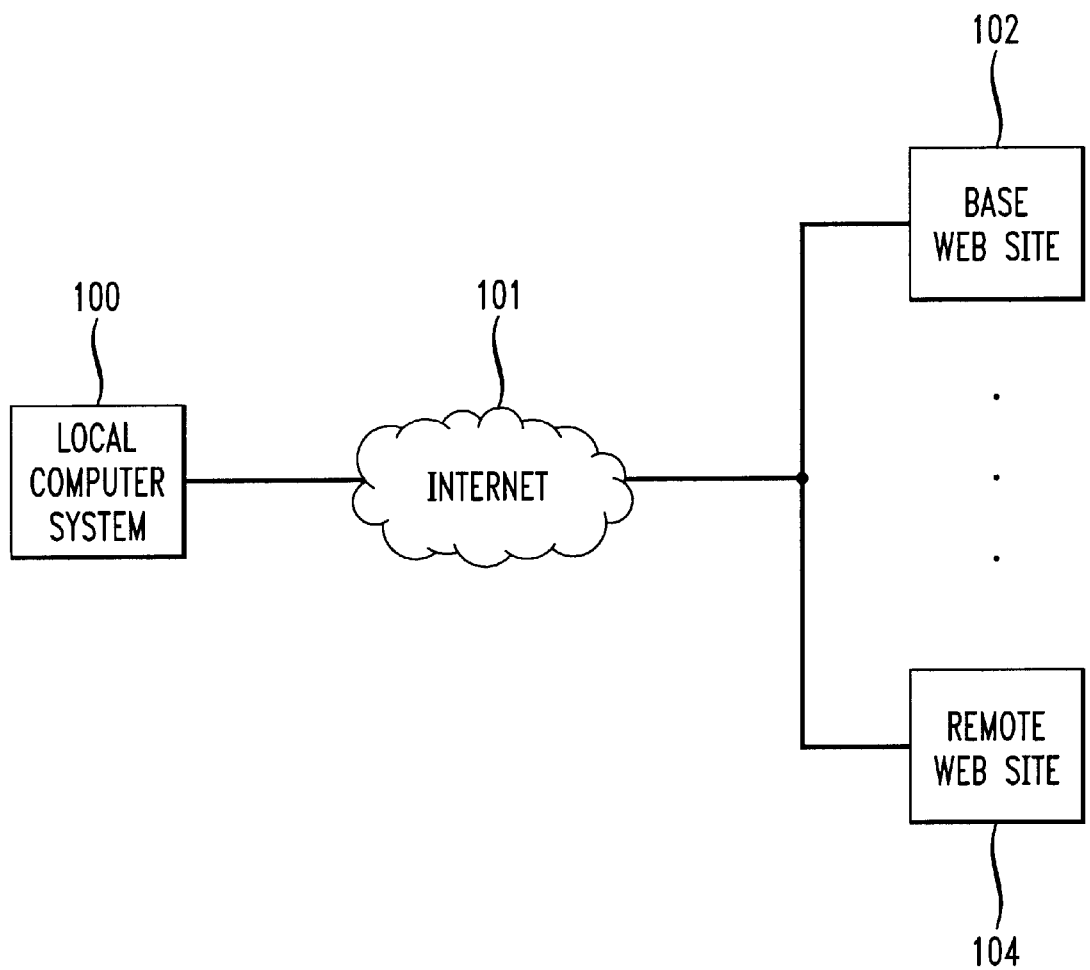
FIG. 1 schematically shows a commonly used network arrangement in which a local computer system may communicate with various network sites via the Internet.

FIG. 1 schematically shows a commonly used network arrangement in which a local computer system 100 may communicate with various network sites via the Internet 101. When utilized with a preferred embodiment of the invention, the network sites include a base World Wide Web site ("base web site 102") for direct access by a user of the local computer system 100, a remote World Wide Web site ("remote web site 104") that, as discussed in detail below, is accessed by the base web site 102, and a plurality of other World Wide Web sites as shown by the ellipses. By way of example, the base web site 102 may be operated by a software distributor, and the remote web site 104 may be operated by a shipping company that ships software for the software distributor. It should be noted that the base web site 102 and the remote web site 104 may be on the same hardware device (e.g., a network server), or on different hardware devices that communicate through the Internet 101.

In accordance with a preferred embodiment of the invention, in response to a local computer system user's request for data, the base web site 102 is constructed to retrieve the requested data from the remote network site, and then display the retrieved data, on a display device at the local computer system 100, in a preselected format specified by the base web site 102. The user therefore does not directly access the remote web site 104. A generalized flow chart showing the more significant steps of a process for retrieving and displaying the requested data is shown in FIG. 2.

Figure 2:
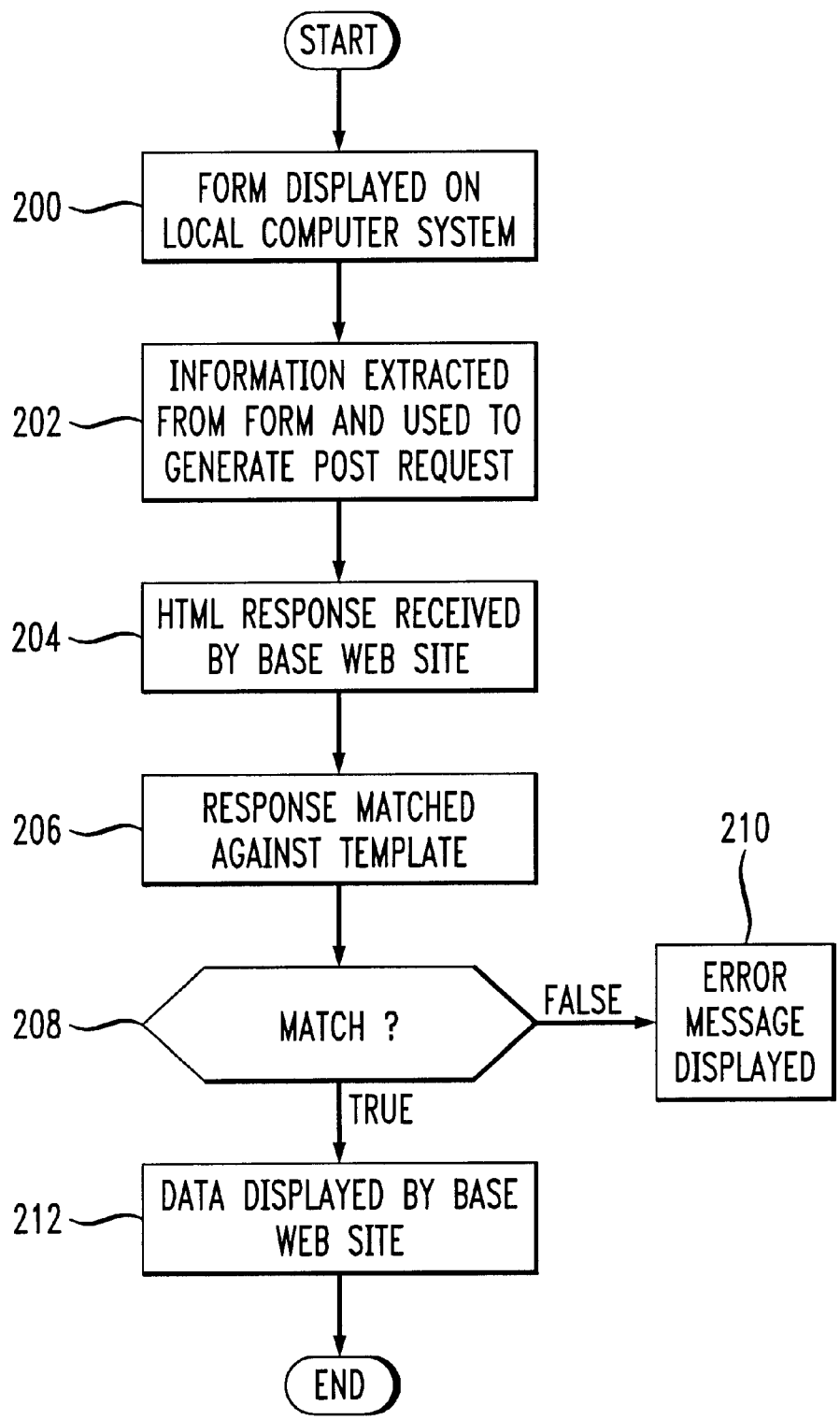
FIG. 2 is a flow chart showing the more significant steps of a process for retrieving data requested by a user of a local computer system, and then displaying the requested data on the local computer system.

The process shown in FIG. 2 starts at step 200 in which an HTML form (not shown) is displayed on the display device at the local computer system 100. The HTML form, which is generated and formatted by the base web site 102 in accordance with conventional processes, includes at least one field for entering information ("form-input") that is required for retrieving the data from the remote web site 104. Once the form-input is entered into the form, the user may select a "submit" button to transmit a message having the form-input information to the base web site 102 for processing. Continuing with the above example, the data to be retrieved may be the delivery date of a software program to the user, and the form-input information required to retrieve the delivery date may be the user's name.

The process then continues to step 202 in which the base web site 102 first extracts the form-input from the message and then generates an HTTP "POST" request. The POST request includes the form-input information which, when received by the remote web site 104, solicits an HTML response from the remote web site 104 having the requested data. The form-inputs thus are used by the remote web site 104 to retrieve the requested data from a storage device such as, for example, a database in a non-volatile storage medium.

In an alternative embodiment, the form-input information may be processed at the base web site 102 into a specified form to be used by the remote web site 104. For example, the shipping web site may require a customer number instead of a customer name. The software developer site therefore must use the form-input customer name to retrieve the customer number from a local database, and then direct that customer number to the shipping web site via the POST request. In a similar manner, the form-input information (or information derived from the form-input information) may be added to multiple POST requests that each are directed to different remote web sites. It is expected that such POST requests would solicit responses having different formats.

The process then proceeds to step 204 in which the HTML response is received by the base web site 102 for processing. At step 206, a matching mechanism matches the HTML response against a template to locate the requested data within the HTML response. The details of the matching mechanism and its interaction with the template of step 206 are the subject of FIGS. 3A and 3B, both of which are discussed in detail below.

The template used in step 206 merely is an edited version of the HTML response document utilizing Meta-HTML (MHTML) markings. Meta-HTML is described in detail in the "MAWL 2.0 Tutorial", the copyright of which is owned by Lucent Technologies and is available on the World Wide Web at "http://www.bell-labs.com/project/MAWL/tutorial.html." The disclosure of this document is incorporated herein, in its entirety, by reference. MHTML also is described in detail in "Mawl 2.0 Quick Language Reference," the copyright of which is owned by Lucent Technologies and is available on the World Wide Web at "http://www.bell-labs.com/project/MAWL/quickref.html#Mhtml." The disclosure of this document also is incorporated herein, in its entirety, by reference. Both references are referred to herein as "MHTML references."

The MHTML markings act as markers to identify the location of the data within the His response document. MHTML markings used in a preferred embodiment of the invention include "MVAR," "MITER," and "/MITER." When creating the template (i.e., while editing the HTML code of the response document), the MHTML markings are inserted in the HTML code of the response in place of the variable parts of the response. Such insertion positions the MHTML markings relative to the HTML code in the response (which subsequently becomes the template) so that the location of the data may be ascertained by the matching mechanism (discussed below). For example, when a template is being constructed for the software distributor web site, the MVAR variable will be placed in the location of the shipping date if the shipping date part of the shipping web site response is the variable part of that response. Accordingly, when using that template to determine the shipping date from a shipping web site response, the matching mechanism (discussed below) must determine the relative locations of the MVAR variable and the HTML code in the template, and then apply that relationship to the response to locate the shipping date in the response.

In general terms, the MVAR marking is used to match text to a variable. A generalized form of an MVAR marking is as shown below:

<MVAR NAME=x DELIM=string>

Figure 3A:
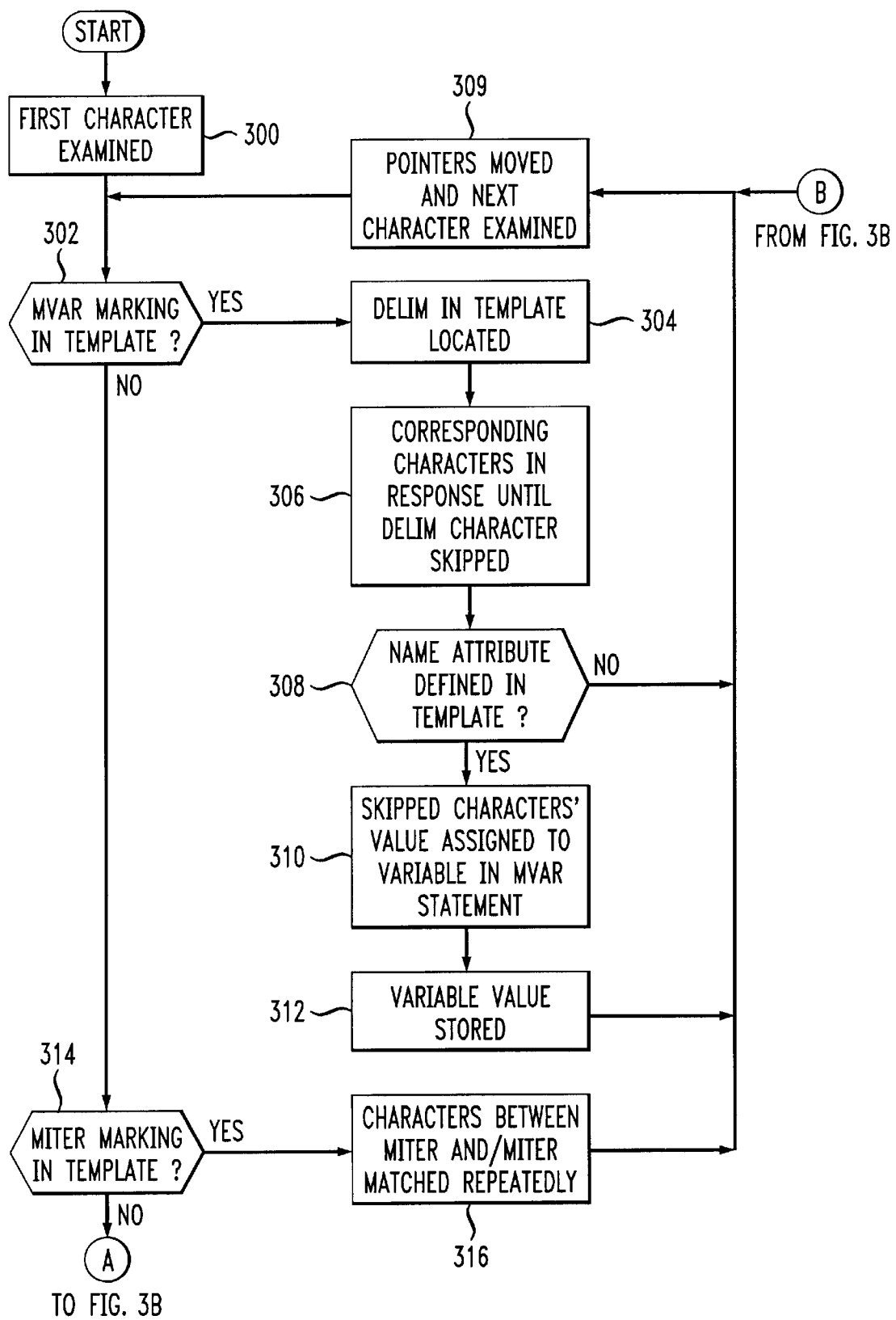
FIGS. 3A and 3B show a preferred process that may be used by a matching mechanism for locating variable information within an HTML response.
Figure 3B:
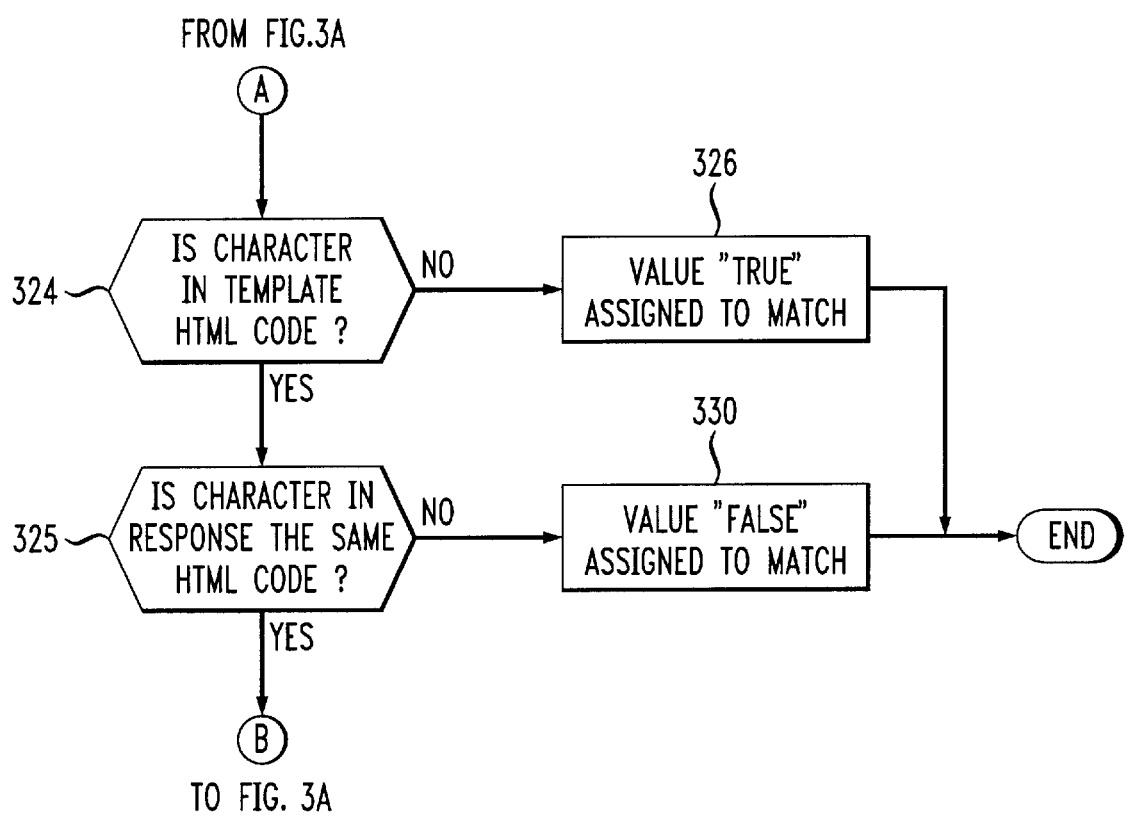

As will be more apparent upon review of FIGS. 3A and 3B and the MHTML references, the NAME attribute of the MVAR marking indicates that a character string at that location in the response under examination must be assigned to a variable named "x." The DELIM attribute identifies a string of individual characters that each may be used as a flag to identify the end of the character string assigned to the variable "x." Reference is made to the MHTML references which describe the function of the MVAR marking in greater detail.

The MITER and /MITER markings (both of which are short for "MHTML iteration") are used in the template to retrieve a type of information that may be repeated within a response. For example, an unknown number of shipping dates may be used for multiple programs ordered from the software developer by the user. When used in conjunction with the MVAR marking, variable information is retrieved from the response locations corresponding to the area between the MITER and /MITER markings in the template. A generalized form of the MITER marking is as shown below:

<MITER NAME=NAMELIST CURSOR=I DELIM=string>

As will be more apparent upon review of FIGS. 3A and 3B and the MHTML references, the NAME attribute of the MITER marking identifies the name of an array to store the repeated information. The name of the array in this example is "NAMELIST." The CURSOR attribute indicates that the character "I" will be used to represent entries in the array for data between this MITER marking and a subsequently positioned /MITER marking. As is known by those skilled in the art, the cursor attribute enables MITER markings to be nested within other MITER markings. The DELIM marking identifies a string of characters that each may be positioned directly after the last character in the last character string of interest in the response, thus effectively marking the end of the series of character strings. As is known by those skilled in the art, MITER markings and /MITER markings cooperate to retrieve data between such markings by utilizing MVAR markings and other nested MITER and /MITER markings. Reference is made to the MHTML references which describe the function of the MITER and /MITER markings in greater detail.

Returning to the flow chart shown in FIG. 2, after step 206, it then is ascertained if there is a match between the template and the response (step 208). This is ascertained with the matching mechanism shown in FIGS. 3A and 3B. A match indicates that the relative locations of the data and the HTML code in the response are the same as when the template was written. If the template and response are not a match, however, then either the relative locations of the data and HTML code in the response have been modified, or the template is defective. The markings in the template are ineffective if the relative locations of the HTML code and the data in the response have been modified. Accordingly, the template must be rewritten to conform with the new relative locations of data and the HTML code in the response.

If there is not a match at step 208, then the process proceeds to step 210 in which an error message may be displayed on a display device at the base web site 102 indicating that the data may not be retrieved through the base web page. Conversely, if there is a match at step 208, then the data is displayed at the local computer system 100 in a format specified by the base web site 102.

FIGS. 3A and 3B show a preferred process that may be used by the matching mechanism (steps 206) for locating the variable information within the response. The process examines each character in the template with a template pointer, and each character in the HTML response with a response pointer. The process begins at step 300 in which the first character in the template is examined. It then is determined if that character is either an MVAR marking (step 302), a MITER marking (step 314), or HTML code (step 324). The process thus proceeds based upon the type of character under examination.

If the character is an MVAR marking, the process moves to step 304 in which the template pointer is incremented to the DELIM marking to determine the delimiting character (i.e., the first character immediately after the variable under examination). At step 306, the character corresponding to the DELIM character is located in the response, and the response pointer is moved to point to such character. The response pointer thus skips all of the text from the character corresponding to the beginning of the MVAR marking, to the character identified by the DELIM character. It then is determined at step 308 if the NAME attribute is defined in the MVAR marking. As is known by those skilled in the art, the NAME attribute is not defined in an MVAR marking if it is not necessary to retrieve the variable information corresponding to that MVAR marking. Accordingly, if the NAME attribute is not defined, then the process loops back to step 309, thereby moving the pointers to examine the next corresponding characters in the response and template.

If the NAME attribute is defined, then the process moves to step 310 in which the value of the character or character string that was skipped in the response is assigned to the variable in the MVAR marking. The value of the variable is stored in memory at step 312. The process then loops back to step 309 in which the pointers are moved to examine the next corresponding characters in the response and template.

If at step 302 the character was not an MVAR marking, then it is determined if the character is a MITER marking. As noted above, a MITER marking indicates that a list of character strings may be retrieved from the response. If a MITER marking is detected, the process moves to step 316 in which the characters in the response corresponding to the area between the MITER and /MITER markings in the template are matched in accordance with the matching process. Specifically, the characters and markings between the MITER and /MITER markings are treated as a sub-template, and the characters in the corresponding response locations similarly are treated as a sub-response. Accordingly, the entire matching process shown in FIGS. 3A and 3B is iterated within step 316 for the sub-template and sub-response. Once the characters between the MITER and /MITER markings are matched via the iterated process of step 316, the process loops to step to step 309.

If at step 314 it is determined that the character is not a MITER marking, then the process continues to off-page connector "A" to step 324 (FIG. 3B) to determine if the character under examination in the template is HTML code. If such character is not HTML code, then the end of the response has been reached and the variables of interest presumably have all been retrieved.

In such case, the process proceeds to step 330 in which a "match" variable (used by step 208 in the process shown in FIG. 2) is set to "true."

Conversely, if at step 324 it is determined that the character under examination in the template is HTML code, then the process continues to step 328 in which it is determined if the character under examination in the response is the same HTML code as that examined in the template. If such character is not HTML code, then the template format is different than the response format and thus, information may not be retrieved for display on the local computer system 100 because the formats are incompatible. Accordingly, if the character is not HTML code, then the process continues to step 330 in which the "match" variable (used by step 208 in the process shown in FIG. 2) is set to "false." When the match variable is set to false, a new template must be made to retrieve the data.

Conversely, if in step 328 it is determined that the character under examination in the response is the same HTML code, then the process loops to step 309, via off page connector "B", in which the template pointer is moved to the next MVAR or MITER marking in the template and the response pointer also is moved to such corresponding location. The process thus continues by examining the next character in the template and the response.

When implemented in the base web site, the process shown in FIG. 2 preferably is an application program that utilizes the templates for retrieving and displaying the data. Such application program may be a procedure that is called by a common gateway interface script for retrieving and displaying the data.

It should be apparent that a template must be constructed for each response from a remote web site that is used with the base web site 102. As noted above, the template is a document written in a mark-up language. Constructing a new template for each response from one or more web sites therefore is much simpler and less time consuming than constructing a new application program for each of such responses. Accordingly, the cost of constructing and maintaining the base web site 102 incorporating the invention is significantly less than if the base web site 102 utilized a prior art data retrieval application program.

In one embodiment of the invention, an application program incorporating the invention may be utilized at the local computer system 100 to directly access the remote site 104. Accordingly, such application program may include a graphical user interface for entering the form-input. Once the form input is entered, the program may execute the process shown in FIG. 2 to display the data in a format specified by the application program. Moreover, instead of merely displaying the data, the application program may utilize the data for any desired purpose. For example, the data may be processed to produce new data, added to a paper printout, or passed as input to another application program.

In an alternative embodiment, the invention may be implemented as a computer program product for use with a computer system. Such implementation may include a series of computer instructions fixed either on a tangible medium, such as a computer readable media (e.g., a diskette, CD-ROM, ROM, or fixed disk) or transmittable to a computer system, via a modem or other interface device, such as a communications adapter connected to a network over a medium. Medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

We claim:

1. A computer program product comprising a computer usable medium having computer readable program code thereon for use on a computer system for retrieving data from a first network site for use by a second network site responsive to a first request for the data from a local computer also connected to said computer system, the data having a value, and the computer program product is stored and used at said second network site the computer readable program code including:

program code responsive to said first request from said local computer for generating a data request to said first network where said data is stored, the data request causing a response to be generated by the first network site that is sent back to said second network site, the response having a predetermined location therein with the data requested by said local computer; and program code for matching a marker in a template with the data in the response received from said first network site, the position of the marker in the template identifying the predetermined location of the requested data in the response, the marker including a variable.

2. The computer program product as defined by claim 1 wherein the response received from said first network site is a hypertext markup language (HTML) web page and the template is the same HTML web page except data fields have said markers therein to indicate where data will be in the web pages retrieved from said first network site responsive to the data requests.

3. The computer program product as defined by claim 1 wherein the program code for matching includes:

program code for determining the location of the predetermined location in the template; and program code for locating the predetermined location in the response.

4. The computer program product as defined by claim 1 further comprising program code for extracting the requested data from the predetermined location of data in the response received from said first network site.

5. The computer program product as defined by claim 4 further comprising program code for sending said extracted requested data to said local computer to be displayed thereat.

6. The computer program product as defined by claim 5 wherein said marker includes a first variable that identifies the predetermined location of the requested data in the response from the first network site.

7. The computer program product as defined by claim 6 wherein said marker includes a second variable indicating that there are other predetermined locations of requested data in the response from the first network site and the requested data therein is to be extracted.

8. The computer program product as defined by claim 1 wherein said data request comprises computer program instructions that are sent to said first network site to retrieve the response with the data requested from said local computer.

9. A method of retrieving data in a networked computer system from a first network site for use by a second network site responsive to a first request for the data from a local computer also connected to the computer system, the data having a value, the method comprising the steps of:

generating a second data request for the data responsive to the first request for the data from the local computer, the second data request being for transmission to the first network site, the second data request causing a response to be generated by the first network site that is sent back to said second network site, the response having a predetermined location therein with the data requested by the local computer; and matching a marker in a template with the data in the response received from said first network site, the position of the marker in the template identifying the predetermined location of the data in the response, the marker including a variable.

10. The method as defined by claim 9 wherein the response received from said first network site is a hypertext markup language (HTML) web page and the template is the same HTML web page except data fields have said markers therein to indicate where data will be in the web pages retrieved from said first network site responsive to said second data requests.

11. The method as defined by claim 9 further comprising the step of extracting the requested data from the predetermined location of data in the response received from said first network site.

12. The method as defined by claim 11 further comprising the step of sending said extracted requested data to the local computer to be displayed thereat.

13. The method as defined by claim 12 wherein said marker includes a first variable that identifies the predetermined location of the requested data in the response from the first network site.

14. The method as defined by claim 13 wherein said marker includes a second variable indicating that there are other predetermined locations of requested data in the response from the first network site and the requested data therein is to be extracted.

15. The method as defined by claim 14 wherein said second data request comprises computer program instructions that are sent to said first network site to retrieve the response with the data requested from said local computer.

16. Apparatus used in a computer system for retrieving data from a first network site for use by a second network site responsive to a first data request from a local computer also connected to the computer system, the requested data having a value, the apparatus comprising:

means for generating a second data request for the data responsive to the first data request from the local computer, the second data request being transmitted to the first network site, the second data request causing a response to be generated by the first network site that is sent back to said second network site, the response having a predetermined location therein with the data requested by the local computer; and means for matching a marker in a template with the data in the response received from said first network site, the position of the marker in the template identifying the predetermined location of the requested data in the response, the marker including a variable.

17. The apparatus as defined by claim 16 wherein the response received from said first network site is a hypertext markup language (HTML) web page and the template is the same HTML web page except data fields have said markers therein to indicate where data will be in the web pages retrieved from said first network site responsive to the data requests.

18. The apparatus as defined by claim 16 further comprising means for extracting the requested data from the predetermined location of data in the response received from said first network site.

19. The apparatus as defined by claim 18 further comprising means for sending said extracted requested data to said local computer to be displayed thereat.

20. The apparatus as defined by claim 19 wherein said marker includes a first variable that identifies the predetermined location of the requested data in the response from said first network site.

21. The apparatus as defined by claim 20 wherein said marker includes a second variable indicating that there are other predetermined locations of requested data in the response from said first network site and the requested data therein is to be extracted.

22. The apparatus as defined by claim 16 wherein said data request comprises computer program instructions that are sent to said first network site to retrieve the response with the data requested by said local computer.

* * * * *